March 7, 1961 L. W. PARKER 2,974,284
ROTORS FOR ELECTRICAL INDICATING INSTRUMENTS
AND METHODS OF MAKING THE SAME
Filed Oct. 22, 1957

INVENTOR
Louis W. Parker

BY

ATTORNEYS

United States Patent Office 2,974,284
Patented Mar. 7, 1961

2,974,284

ROTORS FOR ELECTRICAL INDICATING INSTRUMENTS AND METHODS OF MAKING THE SAME

Louis W. Parker, 130 Cutter Mill Road, Great Neck, N.Y.

Filed Oct. 22, 1957, Ser. No. 691,665

5 Claims. (Cl. 324—150)

The present invention relates to electrical indicating instruments of the types employing printed circuit coils in meter movements; and is more particularly concerned with an improved rotor structure adapted for use in such printed circuit meters to provide an electrical indicating system having very high sensitivity.

In my prior U.S. Patent No. 2,773,239, issued December 4, 1956, for: "Electrical Indicating Instruments," I have described an improved measuring instrument comprising a printed circuit meter movement. This meter movement may take various configurations; and in the particular form of the invention set forth in my prior Patent No. 2,773,239, the said meter movement includes a printed circuit of coil configuration carried on opposed sides of a metallic disk. The actual construction of a typical such movement will be described subsequently, and has been described in considerable detail in my Patent No. 2,773,239, which is incorporated herein by reference.

This application is the continuation-in-part of my previous application, Serial No. 619,579, filed October 31, 1956, for: "Magnetic Structure for Electrical Indicating Instruments." In this earlier application I describe methods to achieve linearity of the meter movement without regard to sensitivity, while in the present application I apply such methods to instruments of high sensitivity. My earlier application Serial No. 619,579 is hereby incorporated in this present application by reference.

In general, meter movements of the types described in the aforementioned prior Patent No. 2,773,239 take the form of a metallic disk, preferably of aluminum, having an extremely thin insulating coating thereon which may, for instance, comprise an anodized surface on the said aluminum disk. This anodized surface is in turn covered on both sides of the disk by a thin copper sheet etched into the form of one or more coil sections; and the coil sections on opposed sides of the aforementioned aluminum disk are interconnected to one another, thereby to provide an extremely simple but efficient meter movement structure, which may be mounted between appropriate pole pieces for the measurement of various electrical quantities.

It has, in general, been found that rotor constructions of the types described in my said prior Patent No. 2,773,239 operate with considerable accuracy and success in meters having sensitivities of five milliamperes full-scale and higher; but it has been found extremely difficult to effect a meter having a sensitivity of, for example, one milliampere full-scale when the aforementioned structure of my said prior patent is employed. In particular, it has been found that the thickness of the printed coil line which is etched on the opposed surfaces of the aforementioned aluminum or alloy disk comprising the rotor of my said prior patent is, due to various practical considerations, limited to approximately 5/1000 of an inch; and as a result, the number of turns on the rotor is also necessarily limited so that the sensitivity of the instrument cannot be materially increased by using more turns on the printed coil.

Notwithstanding this inherent limitation in the number of coil turns which can be provided, it has been suggested that the sensitivity of the instrument could be increased by reducing the spring stiffness of the helical springs which are employed to provide a force against which the developed torque acts and which couple currents to and from the coil rotor; and it has also been suggested that the sensitivity of the instrument could be increased by increasing the magnetic field, or by changing both of these parameters simultaneously. As a practical matter, however, it has been found that a reduction of spring stiffness results in lowering the natural period of the meter movement, with a consequent lowering of the torque-to-weight ratio of the movement. This lowering of the natural period is in fact highly undesirable since the meter may require several seconds to arrive at a correct indication; and inasmuch further as pivot friction then becomes an important factor which may cause the movement to give different readings when the current being measured is either lowered or raised from one value toward a common point. By the same token, it has been found that an increase of magnetic field, in an attempt to increase sensitivity, quickly increases the damping of the overall movement to the point where the meter again becomes extremely slow; and this undesirable result is further complicated by the fact that the magnitude of increased field which can be effected is limited and is in fact quickly reached, due to the limited strength of permanent magnet materials which are ordinarily employed as pole pieces in meter movements of the types contemplated.

As a result of these factors therefore, it has been determined that none of the conventional methods, nor any combination of them, are in fact practicably useful in increasing the sensitivity of the instrument from five milliamperes full-scale to, for example, one milliampere full-scale. In addition to the above difficulties, it was also found that, if attempts are made to reduce the moment of inertia and magnetic damping of printed circuit rotors, of the types generally described in my said prior patent, by decreasing the thickness of the aluminum disk, the aluminum disk becomes extremely difficult to handle. In particular, it was found that the disk, when made thinner, had a tendency to spring out of its desired natural shape due to inherent stresses in the metal which could not be completely eliminated by annealing; and this factor, therefore, made it necessary to greatly increae the air gap of the magnet, lowering the sensitivity of the instrument.

The present invention serves to obviate each of these difficulties, and is particularly concerned with an improved rotor structure for use in high sensitivity meter movements employing the printed circuit techniques described in my said prior Patent No. 2,773,239, and effecting the advantages attendant to such structures, while at the same time avoiding the disadvantages described previously. In particular, the present invention is concerned with an improved rotor structure as well as with novel methods of effecting such a structure whereby a relatively light movement, carrying printed circuit coils thereon and having a lower moment of inertia and damping than printed circuit rotors suggested heretofore, can be effected; these improvements being accomplished in a structure which is adapted to maintain a desired substantially flat shape properly braced, thereby to permit the construction of a highly sensitive meter giving extremely accurate readings.

It is accordingly an object of the present invention to provide an improved rotor for electrical indicating instruments.

Another object of the present invention resides in the provision of novel methods of preparing improved rotors having printed circuit coils thereon.

A still further object of the present invention resides in the provision of an improved electrical indicating instrument, and particularly an improved rotor for use in such electrical indicating instruments, whereby greater meter sensitivity can be acomplished than has been possible heretofore; and in particular wherein a meter sensitivity in the order of one milliampere full-scale can be effected.

Still another object of the present invention resides in the provision of a rotor for use in printed circuit meters, which rotor has a lower moment of inertia and damping than has been possible in printed circuit rotors suggested heretofore.

Still another object of the present invention resides in the provision of an improved rotor for use in printed circuit meters which is so constructed that it tends to maintain a desired substantially flat shape.

Another object of the present invention resides in the provision of improved bracing means for meter rotors, and particularly in the employment of stiff filaments of nylon or other material cemented over a substantial area of the rotor disk to brace it.

A further object of the present invention resides in the provision of an improved meter movement having extremely high sensitivity and utilizing a novel construction of both rotor and pointer whereby meter movements of small size but of high sensitivity and rapid, accurate operation can be effected.

Still another object resides in the provision of a meter rotor utilizing ultrasonic welding joints to conduct electric current from one to the other side of the rotor.

In accomplishing the foregoing objects and advantages, as well as other objects and advantages which will become readily apparent to those skilled in the art, the present invention contemplates the provision of an improved rotor having a laminated construction. The lamination or sandwich construction contemplated by the present invention comprises a thin metallic sheet, preferably a sheet of aluminum foil, having a pair of light plastic laminates bonded to opposed sides thereof, with copper or aluminum coils being carried by the outer faces of the said plastic sheets. The aforementioned coils are interconnected to one another on opposed sides of the aforementioned sandwich or laminated structure by an improved technique to be described hereinafter; and the overall structure therefore comprises a disk having printed circuit coils thereon interconnected to one another and also having an aluminum or other conductive surface therein for damping purposes, whereby the structure is analogous to the structures described in my said prior Patent No. 2,773,239, and accomplishes the appreciable advantages of that prior structure.

By the use of properly processed plastic sheets, the overall laminate is caused to remain straight and flat, even if accidentally bent during production; and the aforementioned thin aluminum foil is unable to exert sufficient springiness to alter the shape of the disk. Moreover, the overall structure exhibits sufficient thickness to resist bending and, inasmuch as extremely thin metallic sheets can be employed in the laminated structure, this resistance to bending is accomplished without increasing the weight of the overall rotor structure. The decreased weight of the overall structure, and the decreased thickness of damping member which is employed, results in an overall decrease of the moment of inertia and damping of the rotor disk; and in practice, it has been found that the resultant disk, when employed in a meter movement, can accomplish extremely accurate readings in movements having a sensitivity in the order of one milliampere full-scale.

The foregoing objects, advantages, construction and operation of the present invention will become more readily apparent from the following description and accompanying drawings, in which.

Figure 1:
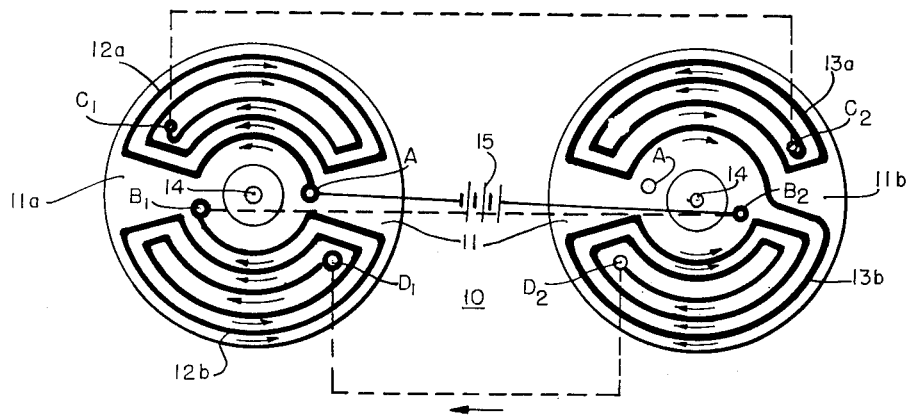
Figure 1 is a schematic diagram of a meter movement such as that taught in my prior Patent No. 2,773,239.

Referring now to Figure 1, it will be seen that printed circuit meters, generally of the types described in my Patent No. 2,773,239, may comprise a rotor 10 taking the form of a disk 11 having opposed sides 11a and 11b. As described in my prior Patent No. 2,773,239, the said disk may be formed of an aluminum alloy; and the two opposed sides 11a and 11b carry printed circuit coils 12a—12b and 13a—13b. The disk 11 may be formed by initially anodizing the exterior surface of the aluminum or aluminum alloy disk 11, thereby to form a thin coating of insulating aluminum oxide on the opposed sides of said disk 11. A thin sheet of conductive material, such as copper or aluminum, may thereafter be cemented onto the aforementioned aluminum oxide insulating layer, and a photo-etching technique can then be employed to etch away chemically portions of this metal layer, thereby to leave the printed coils, designated 12a—12b and 13a—13b, on the opposed sides of the disk or rotor 11. The resulting structure, therefore, as contemplated by my said prior patent, comprises a rotor or disk of aluminum having printed circuit coils on both sides thereof, with these printed circuit coils being insulated from the aluminum disk through the agency of a very thin insulating coating of aluminum oxide.

When used in a meter, the coil sections on opposed sides of the disk 11 are interconnected to one another. In particular, the coil points designated B1 and B2, as well as those designated C1 and C2 and D1 and D2, on opposed sides of the disk, are interconnected by conductive deposits passing through disk 11. The overall coil structure thus effected may be mounted on pivot point 14 between appropriate pole pieces (not shown) which may, if desired, be adjustable in position to provide variable air gaps between the said pole pieces and the disk 11; and a current to be measured, provided for example by a source 15, can then be applied between points A and B2 on opposed sides of the disk through appropriate hair springs (not shown).

The overall structure thus illustrated in Figure 1 is characterized by the provision of a relatively massive aluminum structure which provides relatively high magnetic damping; and in addition, the structure is further characterized by the provision of printed circuit coils carried on opposed sides of the disk and interconnected to one another as well as to an appropriate source of current to be measured. While this structure operates with desired accuracy and rapidity in meter movements having a sensitivity of five milliamperes full-scale and higher currents full-scale, the said structure has not been found to be particularly acceptable when higher sensitivity meters are desired. Moreover, for the reasons already given, it has been found that an attempt to increase the sensitivity of the overall meter to provide, for example, a full-scale reading at one milliampere, has been unsuccessful when the form of movement illustrated and described in reference to Figure 1 is employed.

The present invention, therefore, contemplates the provision of an improved rotor structure which includes the basic features of the movement thus described in reference to Figures 1, i.e. which includes printed circuit coils as well as an aluminum disk for damping, but which is so modified in construction from the device described in reference to Figure 1 that increased sensitivity can be accomplished.

Figure 2:
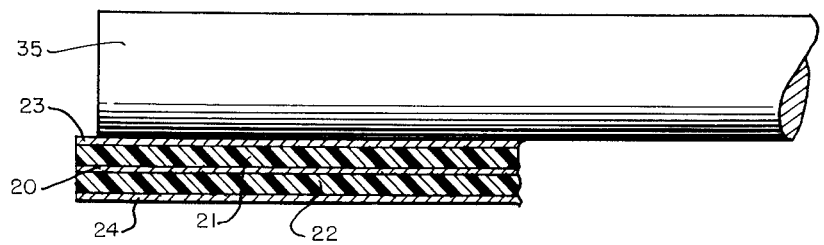
Figure 2 is an enlarged side view of an improved meter movement constructed in accordance with the present invention and illustrating the improved laminated disk and pointer of the present invention.
Figure 3:
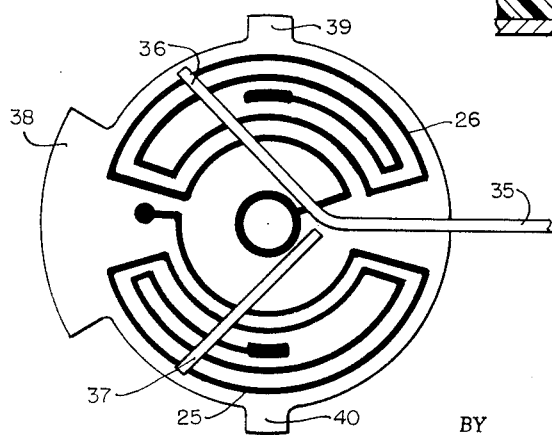
Figure 3 is a top view of an improved disk construction in accordance with the present invention, again illustrating the improvement contemplated by the present invention.

Referring now to Figures 2 and 3, it will be seen that the improved disk contemplated by the present invention comprises a sheet 20 of aluminum foil disposed between a pair of further sheets 21 and 22 of plastic material. The sheet 20 is provided to supply magnetic damping in the overall movement; and the said sheet 20 is in fact extremely thin, being in the order of one thousandth of an inch in thickness. It will be appreciated, of course, that while the damping provided by the said extremely thin sheet or foil of aluminum 20 is lower than that provided by the thicker aluminum disk 11 of Figure 1, nevertheless the requirement for damping drops as the sensitivity of the instrument increases, due to the lowered moment of inertia and lowered spring tension effected in the overall improved meter of the present invention; and accordingly, the thin foil 20 does provide sufficient damping to accomplish the appreciable advantages already described in my prior patent.

As mentioned preveiously, the sheet of aluminum 20 is so thin that it has very little tendency to stress the overall disk contemplated by the present invention; and the plastic sheets 21 and 22 serve to increase the thickness of the overall laminated disk thereby to further resist bending of the sandwich construction. In order to accomplish this resistance to bending without increasing the weight of the overall structure, the plastic material comprising laminations 21 and 22 are preferably materials having a specific gravity lower than aluminum. One preferred such material for use in laminations 21 and 22 comprises an epoxy resin which has a specific gravity of a little over one, thereby to permit each of the laminations 21 and 22 to be about twice as thick as the aluminum foil 20. Indeed, the plastic sheets 21 and 22 are thicker than any of the other parts of the laminate but, due to the low specific gravity of the plastic material employed, they do not add any excessive weight to the disk. In a preferred embodiment of the invention, each of the laminations 21 and 22 is in the order of $2/1000$ of an inch in thickness, and these laminations serve to sandwich the aforementioned $1/1000$ of an inch thick aluminum foil disk 20 therebetween. Such a disk, for use in a one milliampere meter, may have the diameter in the order of one inch.

A further pair of sheets 23 and 24, of copper, aluminum or any other suitable metal, are disposed on the outer faces of the aforementioned plastic disks 21 and 22, and these metallic sheets are respectively insulated from the aforementioned aluminum sheet 20 by the said plastic laminations 21 and 22. In practice, each of the outer metal sheets 23 and 24 also has a thickness in the order of $1/1000$ of an inch (or less); and these sheets are ultimately etched, by a photo-etching technique, to provide coil segments, such as those designated 25 and 26 (see Figure 3), on both sides of the sandwich.

Figure 4:
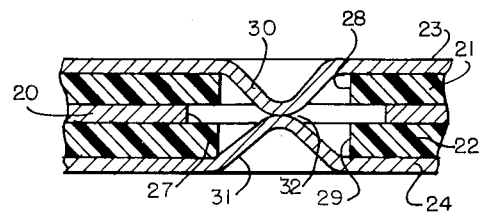
Figure 4 is a greatly exaggerated detail view of a portion of the improved disk of the present invention, illustrating the manner by which the coil sections can be interconnected on opposed sides of the disk.

In order to appreciate the structure shown in Figures 2 and 3 as well as certain other features of the overall invention, the method of construction contemplated by the present invention preferably employs the following steps:

(a) The thin aluminum sheet 20 is initially perforated at a plurality of points 27 (see Figure 4), which points correspond to those points on the overall disk at which coil segments on opposed sides of the disk are to be interconnected with one another (e.g. corresponding to points B1—B2, C1—C2, and D1—D2 of Figure 1).

(b) The pair of plastic laminations 21 and 22 are thereafter disposed adjacent opposed sides of the said perforated foil 20; and each of these plastic laminations 21 and 22 is also perforated, as at 28 and 29, with each of the perforations 28—29 being disposed in alignment with one another in substantially concentric relation to the perforations 27 in the foil 20. As will be apparent from Figure 4, the perforations 28—29 in the plastic sheets 21—22 are preferably of smaller diameter than the perforations 27 in the foil 20.

(c) The pair of copper or aluminum sheets or foils 23—24 are thereafter placed on the opposed faces of the plastic-aluminum sandwich 21—22—23; and these sheets or foils 23 and 24 are initially unperforated and serve to cover both opposed sides of the overall structure.

(d) The overall laminated structure comprising the outer metal sheets 23—24, spaced and insulated from the aluminum sheet 20 by plastic members 21—22, is thereafter subjected to elevated temperature and high pressure in order to cure the plastic laminations 21—22; and after the said laminations have been cured, for an appropriate length of time at appropriate temperatures and pressures, the said structure is cooled, without releasing the pressure, until room temperature is reached after which the pressure is removed. In the course of this curing step, the inner and outer metal foils are each caused to adhere to the epoxy sheets 21—22 whereby the several parts of the laminated structure are bonded to one another, without the use of cement between the several laminations (although such cement may also be employed if considered dsirable).

(e) During the aforementioned curing step, the pressure applied to the outer faces of the opposed outer metal foils 23 and 24 cause the said foils to dimple, as at 30 and 31, adjacent each of the holes 28—29 previously provided in the epoxy sheets 21—22. These dimples, which correspond to the desired points of interconnection, therefore acts as reference points, and an appropriate photographic negative of the desired coil sections can therefore be accurately positioned adjacent the opposed sides of the plastic-metal laminate. Accordingly, accurately positioned coils are prepared on the opposed sides of the laminate, preferably by a photo-etching technique; and the coil is preferably so photographed onto the copper and etched therefrom that it leaves a considerable area of the outer metallic foil portions 23 and 24 unaltered adjacent each of the dimples 30—31.

(f) After the etching, electrical connection is made through the aligned holes 27—28—29 between the dimples 30—31. These connections can be made by piercing or punching a hole through both sheets 23—24 adjacent their dimples 30—31; and by thereafter flowing solder through the resulting punchings to interconnect these dimples 30—31 to one another, thereby to electrically interconnect coils on opposite sides of the plastic-metal laminate. When mass production techniques are contemplated, the two outer metal sheets 23—24 can be welded to one another either by an electric spot welder or by an ultrasonic welder, as at 32 adjacent the dimples 30—31; and the use of an ultrasonic welder is especially advantageous since it may be used with metals such as aluminum, which are ordinarily difficult to weld. In this latter respect, it should be noted that one simple way to weld aluminum by ultrasonic means, and without the use of any flux, is to first tin the points or small areas where welding is contemplated with a soldering iron using an ultrasonically driven tip. After tinning, the aluminum foil is cemented onto the plastic in such manner as to register the tinned surfaces with the holes in the plastic. Welding is done simply by pressing the two tinned points together by two hot metal points.

It should be noted in passing that the weld or solder connection 32 provided between dimples 30 and 31 is, due to the provision of hole 27 in the aluminum foil 20, spaced from the said aluminum foil 20 whereby the printed coils provided on or in surfaces 23—24 are electrically interconnected to one another and are simultaneously electrically spaced from the aluminum damping sheet 20. The overall structure thus provided is light, but nevertheless resilient in construction. Indeed, the finished plastic-metal laminate, while it may be bent, has sufficient stiffness to snap back to its original flat shape;

and actually has an appreciable tendency to retain that substantially flat shape even without the bracing means to be discussed subsequently.

In addition to the above method of cementing the metal foils to plastic sheets, it is also possible to use premetallized plastic sheets where the metallized surface may be used for magnetic damping, or for etching a coil out of it, or both. Metallizing plastic sheets by spraying or vacuum depositing is well known to those skilled in the art. Removal of metallizing from a small area can be done by placing a drop of etching fluid on the area.

One of the functions of the laminated disk rotor thus effected is to carry the pointer, utilized for indicating the quantity being measured; and one of the features of the present invention resides in the provision of an improved pointer to be employed in conjunction with the laminated rotor. I have found in this respect that the best material to be utilized as a pointer is a bristle made of some suitable plastic; and a preferred such bristle comprises an elongated filament or strand of nylon, inasmuch as such nylon material is light, strong and exhibits resilience if bent during overloading of the instrument. In order that the nylon bristle or strand should not warp at high temperature, it is necessary that the stresses within it be of low magnitude; and one way to accomplish this is to stretch the nylon strand during exposure to high temperature.

Figures 2 and 3 illustrate the rotor construction of the present invention employing a nylon bristle strand, and in this respect it must be emphasized that Figure 2 is drawn to a different scale than Figure 3, and is in fact considerably enlarged to emphasize the relative dimensions of the plastic-metal laminate comprising the improved disk of the present invention, the nylon strand pointer carried thereby. In particular, referring to Figure 2, it will be seen that the nylon strand 35 is attached to the plastic-metal laminate by an appropriate cement; and the said strand 35 may comprise a black nylon bristle having a thickness of .015 inch. As a practical matter, therefore, it will be realized that the strand itself may exhibit a diameter which is twice as great as the thickness of the plastic-metal laminate.

Inasmuch as the laminate or disk rotor is very thin, it is not extremely rigid, and the weight of the pointer 35 could conceivably bend it sufficiently, especially under high acceleration, to touch the magnets or pole pieces of the instrument. In order to avoid this and to further strengthen the disk, it is preferred that the bristle 35 be cemented over the entire radius of the disk (see Figure 3); and while this makes it necessary to increase the air gap provided between the rotor and pole pieces somewhat, instruments, such as the types employed herein, preferably employ ceramic magnets whereby the corresponding increase in reluctance is permissible.

In the case of such very thing disks, or when the instrument is to be employed for high acceleration, the end of the bristle 35 adjacent the center of the disk is preferably bent to cover another part of the disk, such as at 36, and this portion 36 of the pointer 35 serves to redistribute the weight of the bristle somewhat and also serves to brace the disk. It is also preferred to add other sections 37 of nylon bristle in angular relation to the section 36, already described, as additional bracing bristles. When such nylon bristles are employed, it is of course possible to obtain them in jet black color in their natural state, and this feature, among others, makes the use of such nylon bristles especially good for pointer structures since they remain black indefinitely and need not be painted during manufacture or after extended use.

It will be appreciated, of course, that the rotor of the instrument must have a fairly good static balance. While conventional balancing means are sometimes desirable, I have found it simpler in most instances to leave additional material on the disk before cutting, at a position opposite to the position of the pointer, in order to overcome the weight of the pointer. A typical such section 38, acting as a counterweight to the pointer 35, has been illustrated in Figure 3. It is also preferred to leave small tabs 39 and 40 on each side of the disk, disposed 90 degrees to the direction of elongation of pointer 35, and these auxiliary tabs 39 and 40 are employed to effect further counterbalancing in directions at right angles to the direction of the pointer 35.

In practice, after the disk is assembled with its necessary hair springs and pivots, it may be placed in a balancing jig to determine which side is heavier, by tilting it right and left. A well-balanced disk should, of course, leave the pointer pointing to the same point when the disk is tilted one way or the other. If the disk is unbalanced, the extent of the unbalance can be read off from the scale, showing the angular difference in the two readings of the pointer, after the jig has been tilted right and left; and knowing this amount of unbalance, one or both of the aforementioned tabs 39—40 and/or the counterweight 38 can be sheared off by an amount determined empirically to correspond to the unbalance angle. It should further be noted, of course, that if too much of the disk is cut off inadvertently during such a balancing operation, the disk can be readily rebalanced by merely adding a small amount of cement near the edge of the disk on its lighter side to serve as an additional weight.

As a result of the foregoing structure, therefore, it will be appreciated that the overall device of the present invention comprises a rotor which employs printed circuit coils and which also incorporates a conductive body for magnetic damping purposes, the entire device being of laminated construction, thereby to provide strength, lightness, insulation, proper damping, and resiliency. The use of an epoxy resin in the aforementioned plastic-metal laminate provides an extremely convenient insulation structure, and also acts as a cementing layer for binding the several metal portions of the laminate within the said laminate. The said epoxy resin layers also permit the overall device to be light but extremely resilient whereby the laminate returns to a desired substantially flat shape even after bending. The epoxy layers, of course, also permit a better material distribution by increasing the thickness of the overall laminate. It will further be appreciated that the use of natural black nylon bristles for a pointer and for bracing means, exhibit substantial advantages over forms of pointer suggested heretofore.

While I have thus described a preferred embodiment of the present invention, many variations will be suggested to those skilled in the art; and it must therefore be emphasized that the foregoing description is meant to be illustrative only, and all such modifications and variations as are in accord with the principles described are meant to fall within the scope of the appended claims.

Having thus described my invention, I claim:

1. An indicating instrument of the type comprising a permanent magnet having a rotor structure mounted for rotation adjacent thereto and adapted to produce a varying field cooperating with the field of said magnet to effect varying rotation of said rotor structure, said rotor structure comprising a substantially flat disk of insulating material having outer substantially flat metallized surfaces of coil configuration for producing said varying field, an inner sheet of metallic material imbedded in said disk in insulated relation to said outer metallized surfaces, means electrically connecting portions of both said outer metallized surfaces to one another, through said disk, in insulated relation to said inner sheet of metallic material, and a pointer element comprising a light, strong and resilient plastic strand, in the nature of nylon, of elongate configuration having a portion of its length cemented to one of said outer surfaces and having the remainder of its length extending beyond the periphery of said disk.

2. The structure of claim 1 wherein said strand is nylon naturally black in color throughout.

3. The structure of claim 2 wherein said nylon strand exhibits a configuration resulting from prior stretching of said strand during exposure to heat whereby said strand has the internal stresses therein reduced to a low magnitude.

4. The combination of claim 2 wherein the diameter of said nylon strand is greater than the thickness of said disk.

5. The combination of claim 2 wherein said pointer element includes a nylon strand portion cemented over an extended part of one of said outer surfaces thereby to serve as bracing means for said disk.

References Cited in the file of this patent

UNITED STATES PATENTS

| | | |
|---|---|---|
| 801,419 | Thomson | Oct. 10, 1905 |
| 2,441,960 | Eisler | May 25, 1948 |
| 2,565,412 | Van Urk | Aug. 21, 1951 |
| 2,757,443 | Steigerwalt | Aug. 7, 1956 |
| 2,773,239 | Parker | Dec. 4, 1956 |
| 2,777,192 | Albright | Jan. 15, 1957 |
| 2,832,935 | Tank | Apr. 29, 1958 |
| 2,858,451 | Silversher | Oct. 28, 1958 |

OTHER REFERENCES

Publication, "Printed Circuit Techniques," National Bureau of Standards Circular 468, November 15, 1947. Page 18 relied on.